United States Patent [19]

Rose et al.

[11] 3,724,263

[45] Apr. 3, 1973

[54] ELECTRICAL DIGITAL DISPLAY TONOMETER

[75] Inventors: Harold Bern Rose, Los Angeles; Bruce Jay Sand, Encino, both of Calif.

[73] Assignee: Bio-Optronics, Inc., Los Angeles, Calif.

[22] Filed: Sept. 29, 1970

[21] Appl. No.: 76,554

[52] U.S. Cl. .................................................... 73/80
[51] Int. Cl. .................................................. A61b 3/16
[58] Field of Search .......... 73/78, 80, 81, 84, 94, 313, 73/DIG. 5, 105, 146.5; 128/2 T; 33/169, 172, 173, 174, 201, 143 L, 147 N, 148 H; 324/34 PS, 99 B, 99 D; 340/195-199, 252, 336

[56] References Cited

UNITED STATES PATENTS

| | | | |
|---|---|---|---|
| 3,315,367 | 4/1967 | Walsh et al. | 33/178 E |
| 3,566,397 | 2/1971 | Walton | 324/99 D |
| 3,594,789 | 7/1971 | Rotier | 340/336 X |
| 3,406,565 | 10/1968 | Murr | 73/80 |
| 3,056,208 | 10/1962 | Murtland et al. | 33/147 N |
| 3,391,463 | 7/1968 | Ambers et al. | 33/149 J |
| 3,458,809 | 7/1969 | Dorey | 324/99 R |
| 3,500,109 | 3/1970 | Sugiyama et al. | 324/99 R |

*Primary Examiner*—James J. Gill
*Attorney*—Ronald W. Reagin

[57] ABSTRACT

Apparatus for measuring displacement is disclosed which includes a prehensible member including a transducer for developing an analog electrical signal whose value is a function of the displacement to be measured and digital display means for visually displaying a digital reading of such value. A stationary unit remote from the prehensible member is also provided which includes conversion means for converting the analog signal into a suitable digital signal for display in the digital display means. A flexible cord is provided interconnecting the prehensible member and the stationary unit for conducting the analog signals from the transducer to the conversion means and the digital signal from the conversion means to the digital display means.

8 Claims, 3 Drawing Figures

PATENTED APR 3 1973 3,724,263
SHEET 1 OF 2
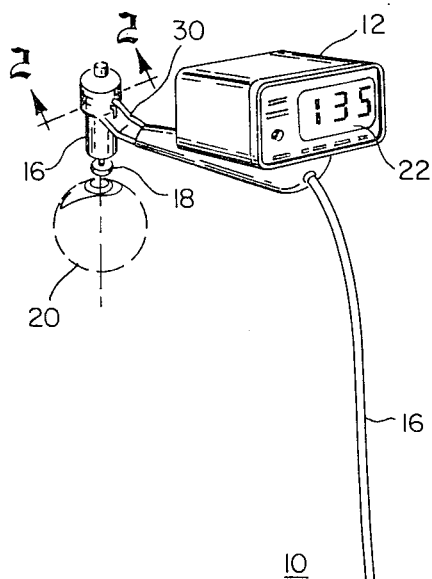
Fig. 1
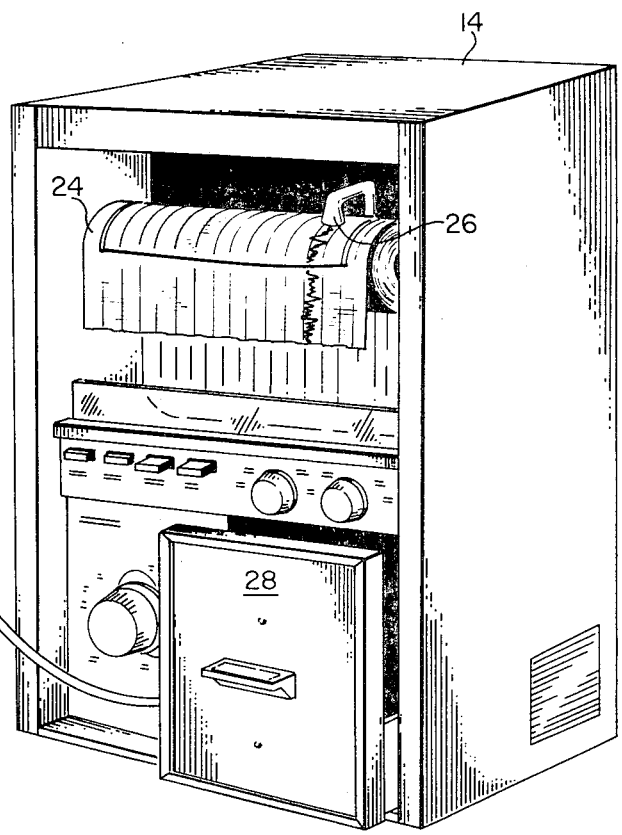
Fig. 2
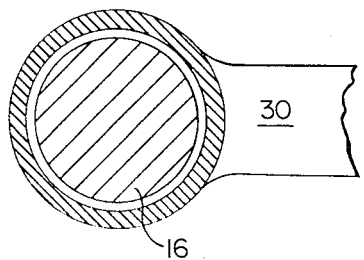
INVENTORS
HAROLD B. ROSE
BRUCE J. SAND
BY
Ronald W. Reagan
ATTORNEY

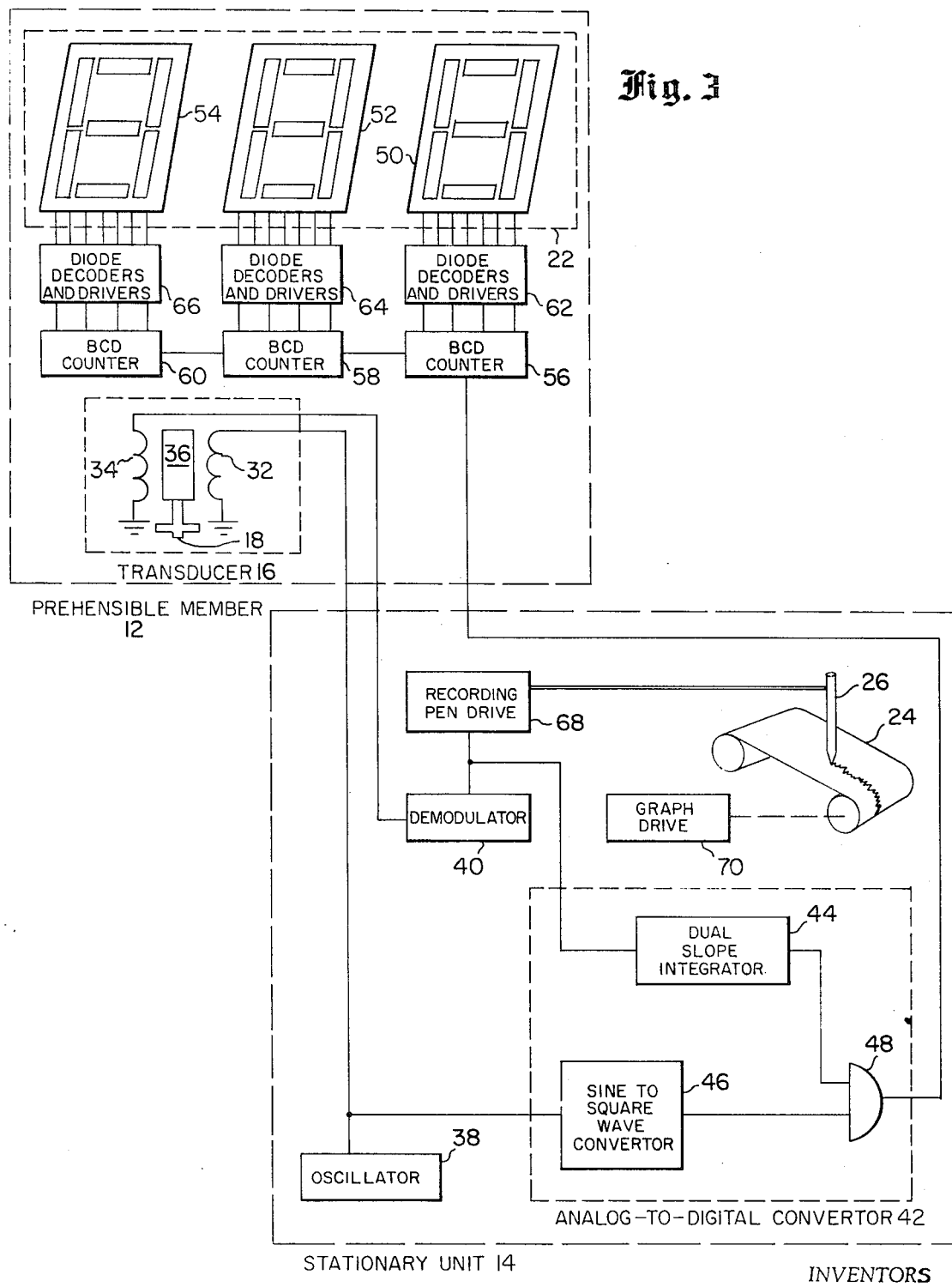

ELECTRICAL DIGITAL DISPLAY TONOMETER

This invention relates to measuring apparatus and more particularly to measuring apparatus such as a tonometer in which the reading of the instrument is electronically digitally displayed at a position where it can be easily seen by the operator.

The eyeball or globe contains various substances, one of which is a watery substance known as aqueous humor. Aqueous humor is produced within the globe and exerts a pressure upon the inner structures of the globe the magnitude of which depends upon the rate of its production and the rate at which it exits from the eyeball through the eye's own specialized filtration mechanism. Any change of these respective rates of flow alters the delicate balance within the eyeball and results in a pressure change or a change in intra-ocular pressure. A sustained elevation of this intra-ocular pressure can result from either an increase in aqueous humor production or a decrease in filtration or both. Such an elevation in pressure may cause damage to the intra-ocular structures and a condition known as glaucoma.

Intra-ocular pressure is measured by using a tonometer. This is a necessary procedure for the diagnosis and treatment of glaucoma. A recording tonometer, or tonograph, measures this pressure electronically and records it permanently as a function of time on a graphic recorder. When the probe of a tonometer is placed upon the globe, the weight inherent in the instrument causes the globe to become softer as aqueous humor is squeezed through the filtration mechanism. In the glaucomatous eye, this softening takes place at a slower rate, usually because in an obstruction in the filter system and a resultant decreased aqueous humor outflow. Measurement of this aqueous humor outflow is accomplished by permitting the tonometer probe to remain in place on the cornea of the eyeball for a period of time, usually about four minutes, and by recording the decay in the intra-ocular pressure.

Most electronic tonometers in the prior art have included a probe or transducer which the operator places against the cornea of the eyeball of the patient. An analog signal is developed in the probe which is a function of the indentation of the probe into the cornea. The amount of this indentation is a function of the degree of hardness of the eyeball, which is in turn dependent upon the intra-ocular pressure within the eyeball. The analog signal so developed in the probe is then coupled back through a flexible cord connected to the transducer to a stationary unit which might be placed on a table or shelf near the patient. This analog signal is then processed within the stationary unit in any suitable manner to develop a signal indicative of the intra-ocular pressure, which is then displayed on a suitable dial or meter on the stationary unit. As was mentioned earlier, this value is then observed or recorded during a predetermined time interval, and the changes in the value of this measurement over the time interval are a measurement of the aqueous humor outflow from the eyeball.

During the development of the present invention, an analysis of the operation of tonometers of the type just described revealed a serious flaw in their design. By its very nature, the procedures described above require extremely careful attention on the part of the operator, since he is placing a hard metal probe directly against the surface of the eyeball of a patient. Thus, it it important that the operator exhibit great care during the time that he is performing the procedure. However, as was mentioned previously, it is also necessary that the value of the reading of the instrument be observed continuously or from time to time throughout the operation, since it is the absolute value and the rate of change of this value that are significant to the operator. It was further observed that there is a definite tendency on the part of the operator to tilt the probe in his hand if he turns his head away from the patient's eyeball to observe this reading on the stationary unit. This tilting of the operator's hand and the tonometer probe causes a false reading from the transducer. This is one of the major causes of errors and potential patient injuries in tonometric measurements. In the prior art, the only solution to this problem was to have a second person present to read the values to the operator so that the operator could continue giving his entire attention to the placement of the probe against the cornea so that accurate and safe readings could be obtained.

It is accordingly an object of the present invention to provide an improved measuring apparatus.

It is another object of the present invention to provide an improved tonometer.

It is yet another object of the present invention to provide an improved tonometer with which the operator can devote his entire attention to performing the tonometric measurements correctly.

Briefly stated, and in accordance with one embodiment of the present invention, apparatus for measuring displacement, such as the displacement of a probe in the transducer of a tonometer, is provided which includes a prehensible member including a transducer for developing an analog electrical signal whose value is a function of the displacement to be measured and digital display means for visually displaying a digital reading of such value. A stationary unit remote from the prehensible member is also provided which includes conversion means for converting the analog signal into a suitable digital signal for display in the digital display means. A flexible cord is provided interconnecting the prehensible member and the stationary unit for conducting the analog signals from the transducer to the conversion means and the digital signal from the conversion means to the digital display means.

For a complete understanding of the invention, together with an appreciation of other objects and advantages thereof, please refer to the following detailed description of the attached drawings, in which:

FIG. 1 is a perspective view of a recording tonometer in accordance with the present invention.

FIG. 2 is a cross sectional view taken along the lines 2—2 of FIG. 1, and

FIG. 3 is a schematic and block diagram of the electronic circuits in the tonometer of FIG. 1.

FIG. 1 shows a perspective view of a measuring apparatus 10 such as a tonometer in accordance with the present invention. The tonometer 10 includes a prehensile member 12, a stationary unit 14 and a flexible electrical cord 16 interconnecting prehensile member 12 and stationary unit 14 to provide the necessary electrical interconnections between these members. The member 12 is called a prehensible member because it is designed to have such a shape and size that it is easily manipulated by hand by an operator. The unit 14 is said to be a stationary unit because, even though it is of such size and weight that it can easily be moved about by an operator, during operation of the device, the unit 14 would normally sit stationary on a shelf or counter top near the operator but out of the way of the measurement, with the unit 14 receiving all of its necessary input signals and sending its output signals through the flexible cord 16.

Prehensible member 12 includes a transducer 16 having a probe 18 at one end thereof. Transducer 16 may be any unit which provides an analog signal which is a function of the linear displacement of the probe 18 at any given instant. Details of a suitable transducer are shown and described in connected with FIG. 3 below.

In operation, tonometric measurements are obtained when the operator manipulates the prehensible member 12 in such a way that the probe 18 rests upon the cornea of an eyeball 20, shown schematically. As was mentioned above, the weight of probe 18 causes it to become indented into the surface of the eyeball 20 to a degree which is a function of the intra-ocular pressure within eyeball 20. Transducer 14 develops an analog signal indicative of the value of this indentation and this analog signal is transmitted through flexible cable 16 to the stationary unit 14. Among other things, stationary unit 14 includes a suitable analog-to-digital converter for converting this analog signal into a usable digital signal, which is in turn connected through flexible cable 16 to digital display means 22 located in prehensible member 12.

The arrangement just described provides advantages other than merely moving the display from the stationary unit 14 to the prehensible member 12. For example, the digital display 22 is now directly in the field of vision of the operator when he is concentrating on manually positioning prehensible member 12 such that the probe 18 of transducer 16 is properly positioned on the cornea of eyeball 20. Because of this, the operator does not have to turn his head to view the reading during operation. This eliminates the possibility that the operator will inadvertently tilt his hand during such head-turning maneuver, and thus eliminates the possibility of this error and/or potential injury to the patient occuring during the tonometric measurement.

If desired, stationary unit 14 can also include a movable graph 24 and a movable recording pen 26 to provide a permanent written record of the tonometric measurement. The drive mechanisms of these members (not shown in this Figure) can be arranged such that graph 24 is driven only at such time as signals are being received from the prehensible member 12 and pen 26 is driven by the analog signals received from transducer 16.

Stationary unit 14 also includes a compartment 28 in which prehensible member 12 can be stored when not in use, and suitable external controls for operating and adjusting the instrument. Details of this type of operating control form no part of the present invention, and accordingly are not shown in any more detail herein.

FIG. 2 shows a sectional view taken along the lines 2—2 of FIG. 1 and illustrates one of the features of the prehensible member 12 and transducer 16. As shown therein, transducer 16 is movably mounted within an opening in a bracket 30 at one end of prehensible member 12. The inside diameter of the opening in bracket 30 is somewhat larger than the outside diameter of transducer 16 so that when prehensible member 12 is held with the axis of transducer 16 vertical, only the weight of transducer 16 rests on the eyeball of the patient, and no forces from the operator's hand are transmitted from prehensible member 12 through bracket 30 to the patient's eyeball.

FIG. 3 shows a schematic and block diagram representation of suitable electronic circuits for use in the tonometer 10 of FIG. 1. FIG. 3 also shows which portions are located in prehensible member 12 and which are located in stationary unit 14.

As shown therein, transducer 16 comprises a transformer including a primary winding 32, a secondary winding 34 and a movable magnetic core 36 which is connected to the probe 18 of transducer 16. In operation, the primary winding 32 is energized from an oscillator 38 located in stationary unit 14. Oscillator 38 generates a sinusoidal signal having a constant peak magnitude and a suitable frequency such as 20 kilohertz. A signal of the same frequency is then developed in the secondary winding 34 whose magnitude is a function of the position of movable core 36, which position is in turn a function of the displacement of probe 18. The output signal from coil 34 is thus an analog signal of constant frequency which is amplitude modulated as a function of the displacement to be measured.

This analog signal is connected to a demodulator 40 located in stationary unit 14. Demodulator 40 may be any suitable demodulator for demodulating an amplitude modulated signal. The output signal of demodulator 40 is thus a pure analog signal whose magnitude is a function of the position of probe 18, and thus a function of the displacement to be measured.

The analog output signal of demodulator 40 is then applied to an analog-to-digital converter 42 for conversion into a digital signal to drive the digital display means 22 located in prehensible member 12. In the preferred embodiment of the invention, this analog-to-digital conversion is effected by the use of a dual slope integrator 44 which receives its input signals from the demodulator 40 and from a sine-to-square-wave converter 46 which is in turn driven by oscillator 38. The output signal from the dual slope integrator 44 controls an output gate 48 which also receives the output pulses from the square wave converter 46. As is known to those skilled in the art, under such an arrangement the number of pulses passed by output gate 48 is a digital representation of the value of the input analog signal. As is also known to those skilled in the art, since the same oscillator is used to develop the analog signal and to provide the clock pulses, the arrangement automatically compensates for changes in the magnitude of the output signal of oscillator 38 or changes in the frequency of oscillator 38.

The output train of pulses from output gate 48 is connected to the prehensible member 12 to drive the digital display means 22. In the preferred embodiment, the digital display means comprises a plurality of seven element light emitting diodes. Such light emitting diodes per se are well known to those skilled in the art. In the embodiment shown in FIG. 3, seven element light emitting diode matrix 50 represents the "tenths"

digit, seven element diode matrix 52 represents the "ones" digit and seven element diode matrix 54 represents the "tens" digit. Of course, this shown arrangement is merely illustrative of the invention and any desired number of digits representing any desired unit of measurement may be used instead.

The train of digital pulses is applied to three serially connected binary coded decimal counters 56, 58 and 60, which arrangement counts the pulses in the manner well-known to those skilled in the art. The binary signal outputs of these counters in turn controls the seven segment diode decoders and drivers 62, 64 and 66 respectively in which suitable logic circuits energize selected ones of the seven elements of diode matrices 50, 52 and 54 respectively, depending upon the count existing in counters 56, 58 and 60 respectively at a specific sampling time.

As was mentioned previously in connection with the description of FIG. 1, all of the electrical connections between the prehensible member 12 and stationary unit 14 which are shown schematically in FIG. 3 are effected through electrical conductors in the flexible electrical cord 16.

Continuing now the description of FIG. 3, the analog output signal of demodulator 40 is also used to control a recording pen drive 68 which in turn controls the position of recording pen 26. Recording pen 26 provides a permanent record of the tonographic measurement on a movable graph 24 which is driven by graph drive 70. Graph drive 70 can have a separate control unit or, if desired, suitable arrangements (not shown in FIG. 3) can be used to energize graph drive 70 only whenever an output signal occurs from demodulator 40.

While the invention is thus shown and a particular embodiment described in detail, it is not intended that the invention be limited to only the shown embodiment. Instead, many modifications will occur to those skilled in the art which lie within the spirit and scope of the invention. For example, the principals of the invention could be equally applicable to measurements other than tonometric measurements in which it is necessary that an operator devote substantially his entire attention to taking the measurement but which still requires a display of the measurement within the visual field of the operator. It is thus intended that the invention be limited in scope only by the appended claims.

What is claimed is:

1. A tonometer for measuring intra-ocular pressure, comprising, in combination:
    a prehensible member including a transducer for developing an analog electrical signal whose value is a function of the intra-ocular pressure to be measured and digital display means for visually displaying said value,
    a stationary unit remote from said prehensible member including conversion means for converting an analog signal into a digital signal, and
    a flexible cord including a plurality of electrically conductive paths interconnecting said prehensible member and said stationary unit for conducting analog signals from said transducer to said conversion means and digital signals from said conversion means to said digital means, whereby an operator using the tonometer on a patient can simultaneously observe said digital display means and accurately position said transducer on the patient's eyeball.

2. A tonometer according to claim 1 in which said transducer comprises two electrical coils and a movable core member magnetically coupling said coils and means for displacing said core member as a function of the intra-ocular pressure which is to be measured and which further includes an oscillator having an output signal of a predetermined frequency and magnitude located in said stationary unit and means for connecting an output signal from said oscillator through said flexible cord to one of said coils in said transducer, whereby an analog signal is developed in the other of said coils having said predetermined frequency and whose magnitude is a function of the displacement of said core.

3. A tonometer according to claim 2 in which said transducer further includes a probe adapted to be placed against a patient's cornea and means for coupling said probe to said movable core.

4. The tonometer of claim 3 in which said transducer is movably mounted on said prehensible member to allow said transducer to move axially relative to the rest of said prehensible member.

5. The tonometer of claim 4 which further includes an amplitude demodulator located in said stationary unit for demodulating the analog signal from said transducer, means for connecting said analog signal from said transducer through said flexible cord to said demodulator, and means for connecting the output signal from said demodulator to said conversion means.

6. The tonometer of claim 5 in which said conversion means comprises a dual slope integrator, means for connecting the output signal from said demodulator and pulses from said oscillator to said dual slope integrator, an output gate controlled by the output signal from said dual integrator, means for applying pulses from said oscillator to said output gate, whereby the signal from said output gate is a digital signal comprising a series of pulses whose number is a function of the displacement to be measured, and means for connecting said digital signal from said output gate through said flexible cord to said digital display means.

7. The tonometer of claim 6 in which said digital display means comprises a plurality of light emitting diodes arranged in a digital format and which further includes light emitting diode control means located in said prehensible member including a counter for counting the pulses in said digital signal, and means responsible to the count of said counter for energizing selected ones of said light emitting diodes.

8. The tonometer of claim 7 which further includes a movable graph and a movable recording pen located in said stationary unit, means for moving said graph whenever said tonometer is being operated, and means driven by the output signal of said demodulator for moving said recording pen.

* * * * *